US009090301B2

(12) United States Patent
Matsuda

(10) Patent No.: US 9,090,301 B2
(45) Date of Patent: Jul. 28, 2015

(54) ELECTRIC MOTORCYCLE

(75) Inventor: Yoshimoto Matsuda, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 13/976,426

(22) PCT Filed: Dec. 27, 2010

(86) PCT No.: PCT/JP2010/007564
§ 371 (c)(1),
(2), (4) Date: Jun. 26, 2013

(87) PCT Pub. No.: WO2012/090244
PCT Pub. Date: Jul. 5, 2012

(65) Prior Publication Data
US 2013/0270022 A1 Oct. 17, 2013

(51) Int. Cl.
*B62J 99/00* (2009.01)
*B62K 11/00* (2006.01)
(Continued)

(52) U.S. Cl.
CPC ............. *B62K 11/00* (2013.01); *B60L 11/1818* (2013.01); *B62J 6/18* (2013.01); *B62J 99/00* (2013.01); *B62K 11/04* (2013.01); *B62K 19/40* (2013.01); *B60L 2200/12* (2013.01); *B60L 2250/16* (2013.01); *B62J 2300/002* (2013.01); *B62J 2700/00* (2013.01); *B62K 2204/00* (2013.01); *B62K 2208/00* (2013.01); *Y02T 10/7005* (2013.01); *Y02T 10/7088* (2013.01); *Y02T 90/121* (2013.01); *Y02T 90/14* (2013.01)

(58) Field of Classification Search
CPC .............................. B60L 11/1818; B62J 99/00
USPC .................. 180/68.5, 220; 320/104, 109, 115
See application file for complete search history.

(56) References Cited

U.S. PATENT DOCUMENTS 6,157,162 A * 12/2000 Hayashi et al. ................ 320/104
6,203,355 B1 * 3/2001 Neblett et al. ................. 439/372
(Continued)

FOREIGN PATENT DOCUMENTS

CN 101428665 A 5/2009
CN 201376623 Y 1/2010
(Continued)

OTHER PUBLICATIONS

Japanese Patent Office, International Search Report of PCT/JP2010/007564, Apr. 4, 2011, WIPO, 2 pages.
(Continued)

*Primary Examiner* — Joseph Rocca
*Assistant Examiner* — Felicia L Brittman
(74) *Attorney, Agent, or Firm* — Alleman Hall McCoy Russell & Tuttle LLP

(57) ABSTRACT

An electric motorcycle of the present invention, which drives a drive wheel by driving power generated by an electric motor, comprises a charging port which is provided in a vehicle body and to which an outside charging connector connected to an outside electric power supply is removably attached; and a battery configured to be charged with electric power supplied from the outside electric power supply in a state in which the outside charging connector is connected to the charging port, and to discharge the electric power stored therein to supply the electric power to the electric motor; wherein the charging port is oriented in one direction in a vehicle width direction.

10 Claims, 5 Drawing Sheets

(51) Int. Cl.
  *B62K 11/04*  (2006.01)
  *B60L 11/18*  (2006.01)
  *B62J 6/18*   (2006.01)
  *B62K 19/40*  (2006.01)

(56) References Cited

U.S. PATENT DOCUMENTS

| | | | |
|---|---|---|---|
| 6,390,488 B1 * | 5/2002 | Wallingsford | 280/291 |
| 2003/0117103 A1 * | 6/2003 | Lin et al. | 320/104 |
| 2010/0206652 A1 | 8/2010 | Kielland | |

FOREIGN PATENT DOCUMENTS

| | | | |
|---|---|---|---|
| JP | 04358980 A | | 11/1992 |
| JP | 05083863 A | | 4/1993 |
| JP | 05105144 A | | 4/1993 |
| JP | 05105147 A | | 4/1993 |
| JP | 06141407 A | * | 5/1994 |
| JP | 06141407 A | | 5/1995 |
| JP | 07117558 A | | 5/1995 |
| JP | 07123516 A | | 5/1995 |
| JP | 2545948 Y2 | | 5/1997 |
| JP | 10059243 A | | 3/1998 |
| JP | 2000033893 A | | 2/2000 |
| JP | 3343361 B2 | | 11/2002 |
| JP | 2003246287 A | | 6/2003 |
| JP | 2004210074 A | | 7/2004 |
| JP | 2009097270 A | * | 5/2009 |
| JP | 2011063074 A | | 3/2011 |
| WO | 2011024326 A1 | | 3/2011 |

OTHER PUBLICATIONS

European Patent Office, Extended European Search Report of EP10861311, Germany, May 6, 2014, 7 pages.

* cited by examiner

ELECTRIC MOTORCYCLE

TECHNICAL FIELD

The present invention relates to an electric motorcycle which activates an electric motor for generating driving power by electric power discharged from a battery for storing the electric power, to rotate a drive wheel.

BACKGROUND ART

In recent years, for the purpose of environmental protection, etc., an electric motorcycle incorporating as a driving power source an electric motor activated by an electric energy stored in a battery has been developed. Such an electric motorcycle incorporates a charging connector to which an outside charging connector connected to an outside electric power supply is removably attached to charge the battery built into the electric motorcycle with electric power supplied from the outside electric power supply (see e.g., Patent Literature 1).

According to Patent Literature 1, a member having the same shape as that of a fuel tank is provided in a location where the fuel tank is placed in a conventional motorcycle in which an engine is mounted, and the charging connector is provided inside of the member. An internal space of the member is opened and closed by a lid.

CITATION LIST

Patent Literature

Patent Literature 1: Japanese-Laid Open Patent Application Publication No. 2004-210074

SUMMARY OF THE INVENTION

Technical Problem

However, in this configuration, since a charging port is placed in a narrow space in a relatively upper side in the conventional electric motorcycle, a charging work may become messy.

Accordingly, an object of the present invention is to provide an electric motorcycle which allows a charging work to be carried out easily.

Solution to Problem

An electric motorcycle of the present invention, which drives a drive wheel by driving power generated by an electric motor, comprises a charging port which is provided in a vehicle body and to which an outside charging connector connected to an outside electric power supply is removably attached; and a battery which is built into the vehicle body and configured to be charged with electric power supplied from the outside electric power supply in a state in which the outside charging connector is connected to the charging port, and to discharge the electric power stored therein to supply the electric power to the electric motor; wherein the charging port is oriented in one direction in a vehicle width direction. In accordance with this configuration, since the charging port is oriented in one direction in the vehicle width direction, a charging work can be carried out easily.

The vehicle body may be capable of standing independently in a state in which the vehicle body is inclined in the one direction in the vehicle width direction; and the charging port may be placed at the one side in the vehicle width direction. In accordance with this configuration, since rain or snow is less likely to enter the charging port, the charging port can be protected effectively.

In a state in which the vehicle body is standing independently, the charging port may be inclined inward in the vehicle width direction in a direction from its upper portion to its lower portion. In accordance with this configuration, since rain, snow, etc., is less likely to enter the charging port, the charging port can be protected effectively.

The electric motorcycle may comprise a side stand pivotally mounted to a lower portion of the vehicle body at the one side in the vehicle width direction; and the charging port may be oriented in the one direction in the vehicle width direction, which is a direction closer to the side stand. In accordance with this configuration, since the charging port is placed at the same side as the side where the side stand is placed, a parking work, the charging work, and starting preparation can be performed at the same side. Therefore, the electric motorcycle can be easily handled.

The electric motorcycle may comprise a stand ground sensor for detecting whether or not the side stand is in contact with a ground; and a control section which shifts to a charging mode in which the electric motor is inhibited from being activated and the battery is chargeable when the stand ground sensor detects that the side stand is in contact with the ground. In accordance with this configuration, it becomes possible to effectively suppress a situation in which the electric motorcycle drives by mistake in the state in which the vehicle body is standing independently by utilizing the side stand. In addition, when the vehicle body is placed in the state in which the vehicle body is standing independently by utilizing the side stand, the charging can be enabled. As a result, the charging work can be carried out safely.

The electric motorcycle may comprise a seat on which a driver is seated; a step placed below the seat to allow a foot of the driver to rest thereon; and a handle placed forward relative to the seat and gripped by the driver; wherein at least a portion of the charging port is placed within a region surrounded by the seat, the step and the handle when viewed from side. In accordance with this configuration, since the driver straddling the electric motorcycle can easily see a connected state of the connector, it becomes possible to prevent a situation in which the electric motorcycle is operated in a state in which the connector is connected to the outside charging connector.

The electric motorcycle may comprise a seat on which a driver is seated; and a step placed below the seat to allow a foot of the driver to rest thereon; and wherein at least a portion of the charging port is placed within a region connecting the step to the seat. In accordance with this configuration, since the driver cannot easily straddle the seat during the charging, it becomes possible to prevent a situation in which the electric motorcycle drives during the charging.

A roof may be provided above the charging port. In accordance with this configuration, since rain or snow is less likely to enter the charging port, the charging port can be protected effectively.

The electric motorcycle may comprise a lid for opening and closing the charging port. In accordance with this configuration, the charging port can be protected effectively from foreign matters such as rain, snow, a bouncing stone, etc., from a ground surface.

The electric motorcycle may comprise an opening-closing sensor for detecting whether the lid is opened or closed; and a control section which shifts to a charging mode in which the electric motor is inhibited from being activated and the battery is chargeable, when the opening-closing sensor detects that the lid is opened. In accordance with this configuration, it becomes possible to prevent a situation in which the electric motorcycle drives with the lid opened. In particular, it becomes possible to prevent a situation in which the electric motorcycle drives in the state in which the charging connector is attached to the charging port, during the charging or just after the charging.

The electric motorcycle may comprise a main frame member extending rearward from a head pipe; a first seat frame extending rearward and upward from the main frame member; and a second seat frame extending rearward and upward through a space below the first seat frame and coupled to the first seat frame; wherein the charging port may be placed in a space surrounded by the main frame member, the first seat frame and the second seat frame. In accordance with this configuration, the charging port can be protected by the frames.

A charging connector may be provided such that the charging port is removably connected to the outside charging connector such that a DC current flows between the charging connector and the outside charging connector. In accordance with this configuration, it is not necessary to incorporate an AC/DC converter into the electric motorcycle, and hence space saving can be achieved. In addition, during the charging, a current of a great magnitude, which is substantially equal to that during discharging can be flowed, which can reduce time required for the charging.

The above and further objects, features and advantages of the present invention will more fully be apparent from the following detailed description of preferred embodiments with accompanying drawings.

Advantageous Effects of Invention

In accordance with the present invention, it is possible to provide an electric motorcycle which allows a charging work to be carried out easily.

DESCRIPTION OF EMBODIMENTS

Hereinafter, an embodiment of the present invention will be described with reference to the drawings. The stated directions are from the perspective of a driver straddling an electric motorcycle. Throughout the drawings, the same or corresponding components are identified by the same reference symbols, and will not be described in repetition.

Figure 1:
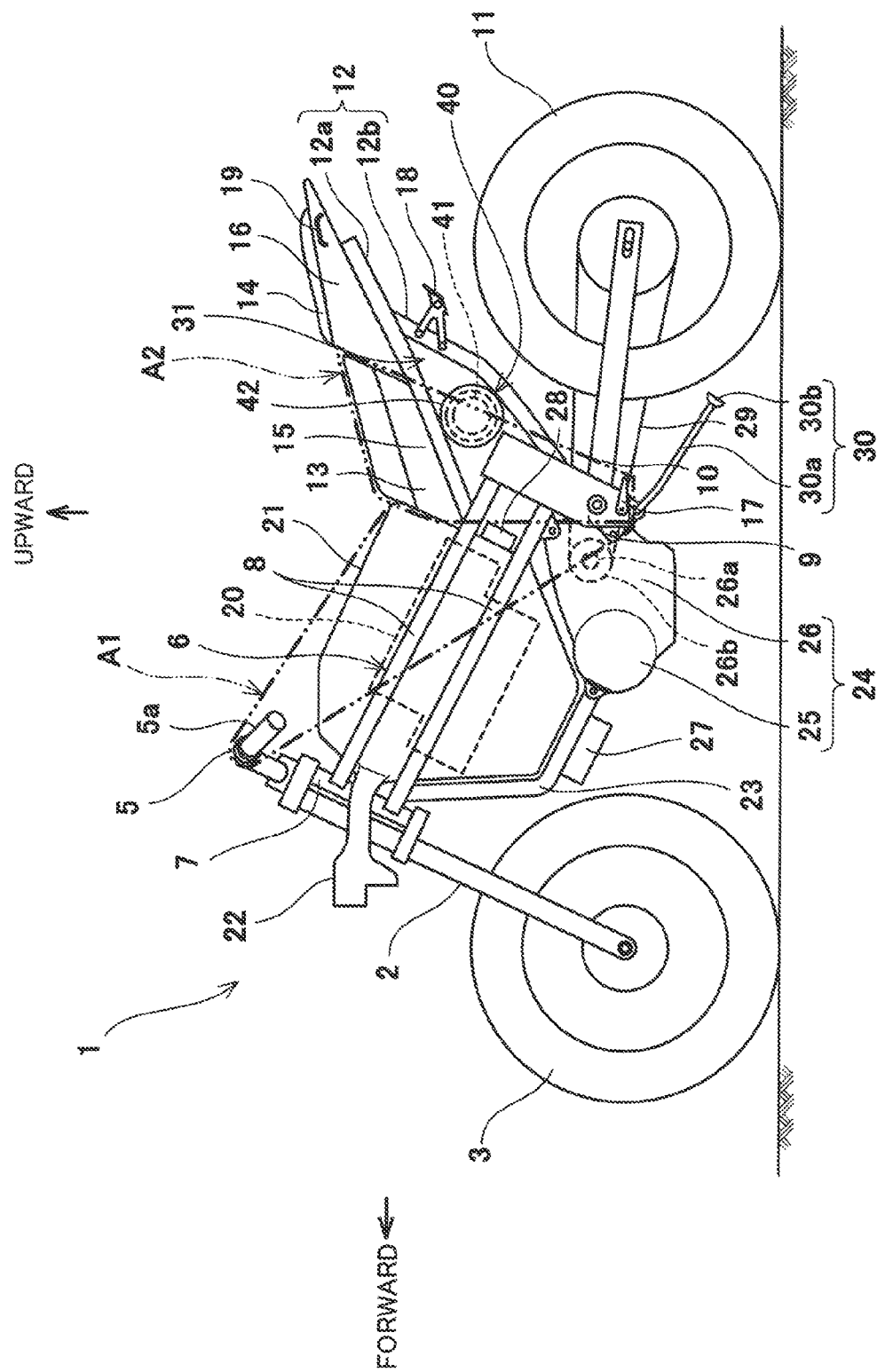
FIG. 1 is a left side view of an electric motorcycle according to an embodiment of the present invention.

FIG. 1 is a left side view of an electric motorcycle 1 according to the embodiment of the present invention. As shown in FIG. 1, the electric motorcycle 1 includes a front fork 2 extending substantially vertically with a predetermined caster angle, and a front wheel 3 which is a driven wheel is rotatably mounted to a lower portion of the front fork 2. A lower portion of a steering shaft (not shown) is coupled to an upper portion of the front fork 2. A bar-type handle 5 is attached to an upper portion of the steering shaft. An accelerator grip 5a is attached on a portion of the handle 5 which is gripped by the driver's right hand. The steering shaft is rotatably inserted into a head pipe 7 defining a vehicle body frame 6. The front wheel 3 is steered by the driver's operation of rotating the handle 5.

The vehicle body frame 6 includes the head pipe 7, and a pair of right and left main frame members 8 and a pair of upper and lower main frame members 8 which extend rearward from the head pipe 7 such that they are inclined slightly downward. Rear portions of the main frame members 8 are coupled to a pair of right and left pivot frame members 9, respectively. A front portion of a swing arm 10 extending in a substantially forward and rearward direction is mounted to the pivot frame members 9 such that the swing arm 10 is pivotable around the front end portion. A rear wheel 11 which is a drive wheel is rotatably mounted to a rear portion of the swing arm 10.

A battery case 21 for accommodating a plurality of batteries 20 is placed between the pair of right and left main frame members 8. The battery case 21 is fastened to the main frame members 8. The battery case 21 is placed such that it overlaps with the main frame members 8 when viewed from side. The main frame members 8 are located in a center portion of the battery case 21 in a height direction when viewed from the side.

The battery case 21 is placed between the handle 5 and a front seat 13 in the forward and rearward direction. An introduction duct 22 is provided in a location forward relative to the battery case 21 and in the vicinity of the head pipe 7 to take in the ram air from forward of the motorcycle and guide the ram air to inside of the battery case 21. A rear end of the introduction duct 22 is coupled to an upper portion of a front end surface of the battery case 21.

The vehicle body frame 6 includes down frame members 23 extending from the head pipe 7, along a space below the battery case 21 such that the down frame members 23 are inclined to be lower than the main frame members 8. An electric motor unit 24 is fastened to rear end portions of the down frame members 23. The electric motor unit 24 is fastened to the main frame members 8 and to the pivot frame members 9. That is, the main frame members 8 and the pivot frame members 9 are coupled to the down frame members 23 via the electric motor unit 24, and the electric motor unit 24 defines a portion of the vehicle body frame 6. The electric motor unit 24 is placed below the main frame members 8 and the battery case 21 and forward relative to the pivot frame members 9. The electric motor unit 24 includes an electric motor 25 for generating driving power and a transmission 26 integrally mounted to a rear portion of the electric motor 25. An inverter 27 is mounted to the down frame members 23 in a location forward relative to the electric motor unit 24. A controller 28 is mounted to a rear portion of the battery case 21. The electric motor 25 is supplied with the electric power from the batteries 20 via the inverter 27 and thereby generates rotational power. The transmission 26 changes a speed of the rotational power generated by the electric motor 25 and transmits the rotational power to the rear wheel 11 via a chain 29 wrapped around a sprocket 26b fastened to an output shaft 26a of the transmission 26.

The main frame members 8 and the pivot frame members 9 are provided with a seat frame member 12 for supporting a front seat 13 which can be straddled by the driver and a rear seat 14 which can be straddled by a passenger. The seat frame member 12 includes a pair of right and left first seat frames 12a and a pair of right and left second seat frames 12b. The right and left first seat frames 12a extend from rear portions of the upper right and left main frame members 8, respectively such that the right and left first seat frames 12a are inclined obliquely upward in a rearward direction. The second seat frames 12b extend from a left side and a right side of rear portions of the pivot frame members 9 such that the second seat frames 12b are inclined obliquely upward in a rearward direction. Upper end portions of the second seat frames 12b are coupled to the first seat frames 12a, respectively. In this way, the seat frame member 12 is coupled to the main frame members 8 and to the pivot frame members 9 such that the seat frame member 12, the main frame members 8 and the pivot frame members 9 construct a truss structure, and each of the first seat frames 12a and the corresponding second seat frame 12b form a space 31 having a substantially triangular shape when viewed from side.

A front seat support member 15 is supported on front portions of the first seat frames 12a. The front seat 13 is supported over the front seat support member 15 such that the front seat 13 extends in the forward and rearward direction. A rear seat support member 16 is supported on rear portions of the first seat frames 12a. The rear seat support member 16 is placed adjacently to and rearward relative to the front seat support member 15. The rear seat 14 is supported over the rear seat support member 16 such that the rear seat 14 extends in the forward and reward direction.

The pivot frame members 9 are placed below the front seat 13 when viewed from side. Front steps 17 are attached to lower portions of the pivot frame members 9, respectively, to allow feet of the driver seated on the front seat 13 to rest thereon. Rear steps 18 are attached to the second seat frames 12b, respectively, to allow feet of the passenger seated on the rear seat 14 to rest thereon. A tandem grip 19 which can be gripped by the passenger protrudes outward in the vehicle width direction, from a left side surface of the rear seat support member 16, to allow the passenger's attitude to be stabilized during driving.

The charging connector 40 which is used to charge the batteries 20 is placed in a space surrounded by the rear portions of the main frame members 8, the upper portions of the pivot frame members 9, the first seat frames 12a and the second seat frames 12b. In this layout, the charging connector 40 is placed above the main frame members 8 and below the seat frame member 12. In addition, the frame members 8 and 12 construct the truss structure as described above. Therefore, the charging connector 40 can be protected effectively by these frames. A charging port 41 of the charging connector 40 is oriented in one direction in the vehicle width direction (leftward in the illustrated example). The charging connector 40 includes a lid 42 for opening and closing the charging port 41. FIG. 1 shows a state in which the charging port 41 is closed by the lid 42.

A side stand 30 is pivotally attached to a left lower portion of the pivot frame member 9. The side stand 30 includes a bar-like rod member 30a and a ground member 30b provided integrally with the tip end portion of the rod member 30a. A base end portion of the rod member 30a is attached to the pivot frame member 9 such that the rod member 30a is pivotable. This allows the ground member 30b to be pivotable between a ground position in which the ground member 30b contacts a ground surface and a retracted position in which the ground member 30b is away from the ground surface. FIG. 1 shows a state in which the ground member 30b is in the retracted position with the rod member 30a extending substantially horizontally and the electric motorcycle 1 is in an upright position.

Figure 2:
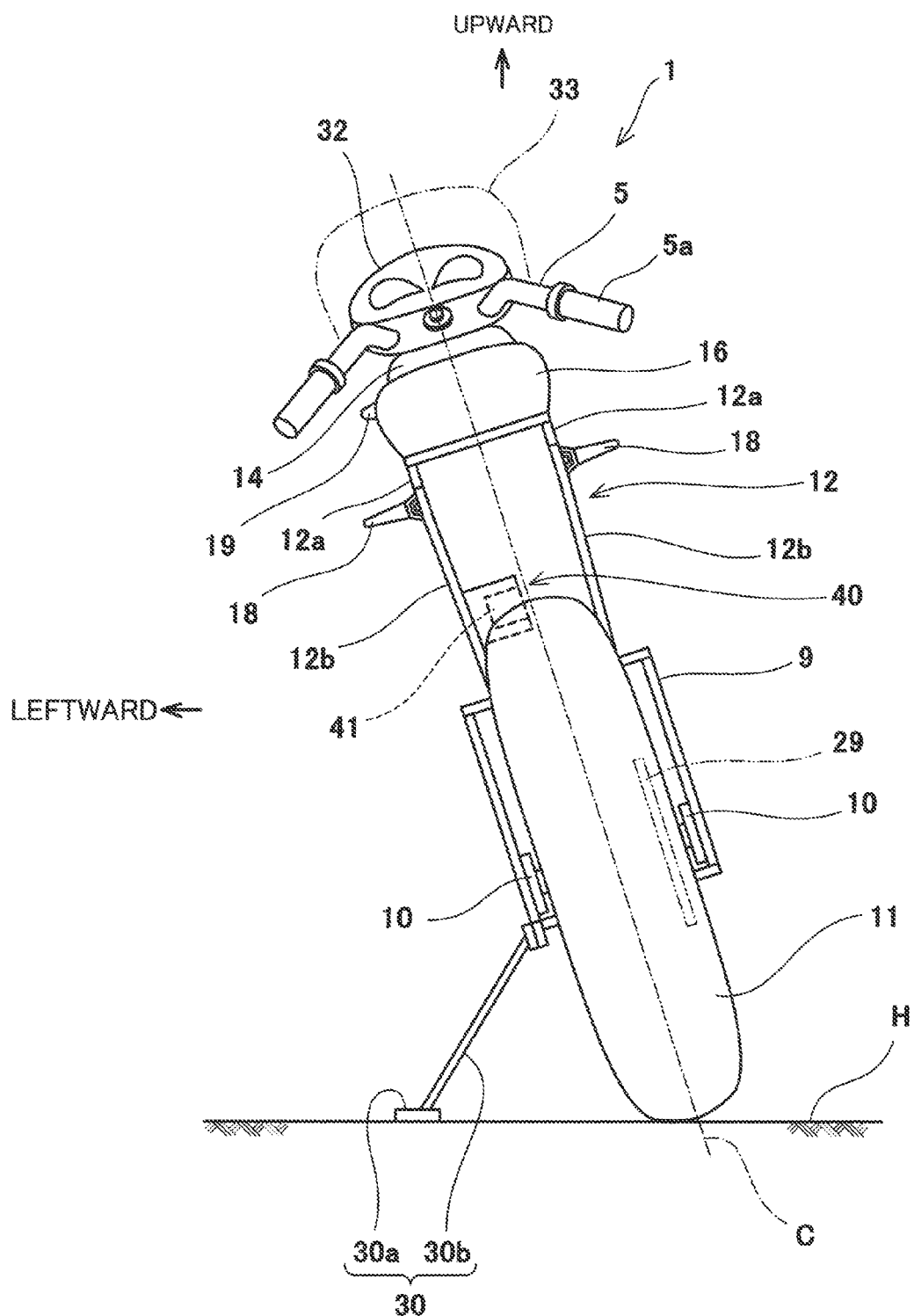
FIG. 2 is a rear view of the electric motorcycle in a state in which a vehicle body is standing independently which is realized by utilizing a side stand.

FIG. 2 is a rear view of the electric motorcycle 1 in a state in which a vehicle body is standing independently, which is realized by utilizing the side stand 30. A ground surface H shown in FIG. 2 is a horizontal surface. In FIG. 2, reference symbol 32 indicates a gauge attached in a location just in front of the handle 5, and reference symbol 33 indicates a wind shield for protecting the driver from ram air from forward of the motorcycle. As shown in FIG. 2, the rod member 30a of the side stand 30 extends downward in one direction (leftward) in the vehicle width direction from the pivot frame member 9, thereby allowing the ground member 30b to be in the ground position. The electric motorcycle 1 is supported on the ground surface H by three points which are the front wheel 3 (see FIG. 1), the rear wheel 11 and the ground member 30b of the side stand 30. The electric motorcycle 1 is able to stand independently in a state in which the electric motorcycle 1 is not applied with a propulsive force. At this time, when viewed from rear, a center line C in the vehicle width direction is inclined in one direction (leftward), i.e., in a direction closer to the side stand 30 in the vehicle width direction, with respect to a direction perpendicular to the ground surface H.

The charging connector 40 is located at one side in the vehicle width direction, with respect to the center line C in the vehicle width direction. The chain 29 for transmitting driving power from the electric motor unit 24 (see FIG. 1) to the rear wheel 11 is located at the other side (right side) in the vehicle width direction, with respect to the center line C in the vehicle width direction. Thus, it becomes possible to effectively avoid the charging connector 40 from interfering with the chain 29 for transmitting driving power to the rear wheel 11. In addition, the electric motor unit 24 and the chain 29 can be laid out more flexibly in the relation with the charging connector 40.

Figure 3:
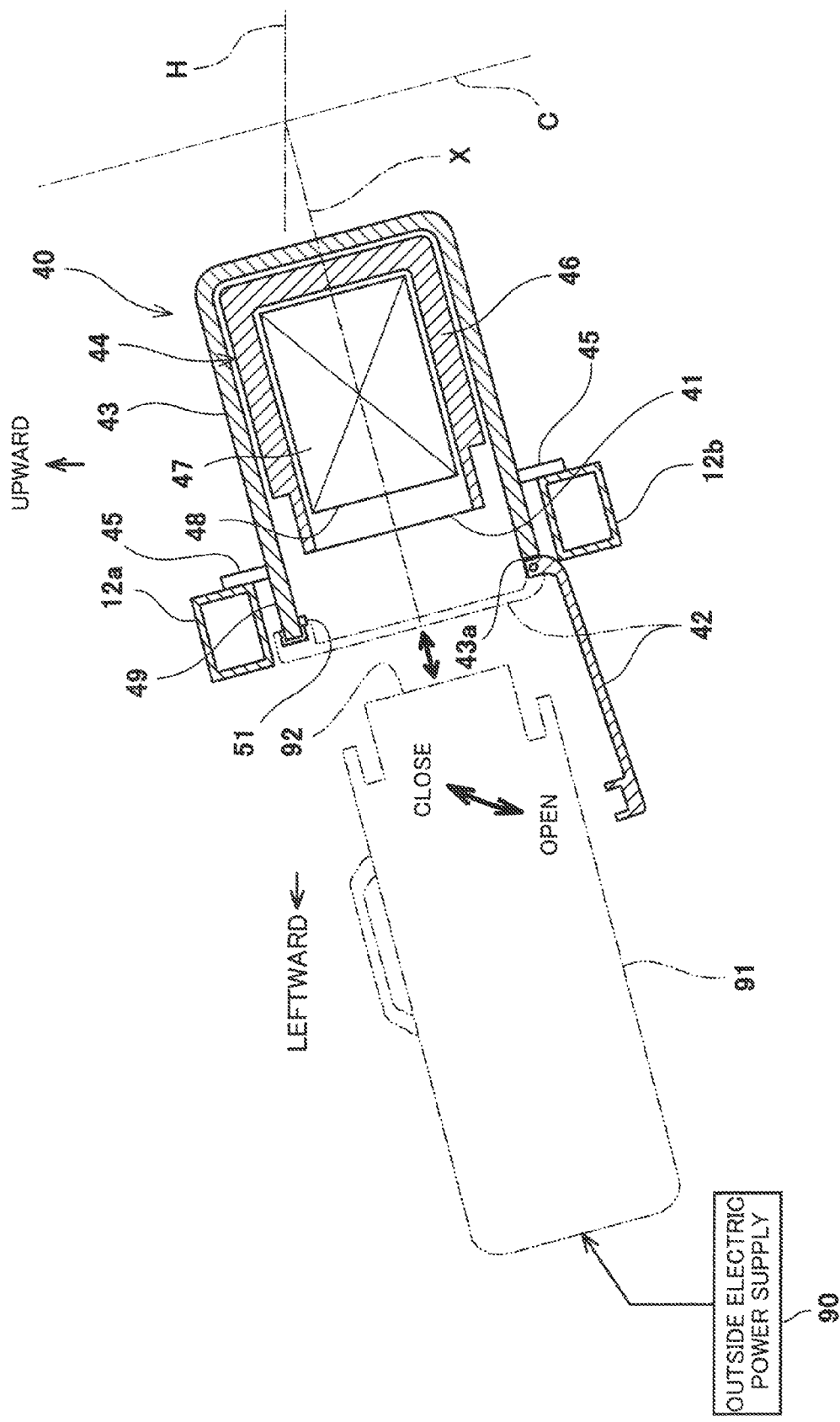
FIG. 3 is a rear cross-sectional view showing a region surrounding a charging connector in the state in which the vehicle body is standing independently.

FIG. 3 is a rear cross-sectional view showing a region surrounding the charging connector 40 in the state in which the vehicle body of the electric motorcycle is standing independently, a part of which is shown in cross-section. As shown in FIG. 3, the charging connector 40 includes a cylindrical casing 43 and a receptacle connector 44. The casing 43 has an opening 43a at least at one side in its axial direction. The casing 43 has a plurality of flanges 45 protruding from its outer peripheral surface. The casing 43 is mounted to the vehicle body frame 6 in such a manner that the plurality of flanges 45 are fastened to the first seat frame 12a and to the second seat frame 12b by bolts, etc. in a state in which the opening 43a is oriented in one direction (leftward) in the vehicle width direction.

The receptacle connector 44 includes a cylindrical internal housing 46 and a connector body 47 accommodated into the internal housing 46. The internal housing 46 is configured such that at least one side opens in a circular shape. This opening is oriented in one direction (leftward) in the vehicle width direction, thereby forming the charging port 41. The charging port 41 is placed at the other side (right side) in the vehicle width direction relative to the opening of the casing 43, i.e., inside of the casing 43. The connector body 47 has a connector surface 48 at one side (left side) in the vehicle width direction. In a state in which the outside charging connector 91 is attached to the charging port 41 and a connector surface 92 of the outside charging connector 91 is fitted to the connector surface 48, the outside charging connector 91 is electrically and mechanically connected to the charging connector 40.

The lid 42 is pivotally mounted to the casing 43 via a hinge 50. The hinge 50 has an angular displacement axis extending in a lengthwise direction of the vehicle body and is provided at a lower portion of one end portion of the casing 43 in its axial direction. This allows the lid 42 to be pivotable around the angular displacement axis between a closed position (see two-dotted line in FIG. 3) in which the lid 42 extends upward from the hinge 50 and closes the opening 43a and an open position (see solid line in FIG. 3) in which the lid 42 extends in one direction in the vehicle width direction from the hinge 50. Since the charging port 41 is placed inside of the casing 43, the charging port 41 oriented in one direction (leftward) in the vehicle with direction is opened by opening the lid 42 to open the opening 43a.

An opening-closing switch 51 is attached to an inner peripheral portion of the opening 43a of the casing 43, in a location which is radially opposed to the hinge 50. In the state in which the lid 42 is in the closed position, the lid 42 turns ON the opening-closing switch 51, which outputs a signal (hereinafter this signal will be referred to as "ON signal") indicating that the lid is closed, and the charging port 41 and the opening 43a are closed. When the lid 42 is pivoted from the closed position toward the open position, the lid 42 moves away from the opening-closing switch 51, which outputs a signal (hereinafter this signal will be referred to as "OFF signal") indicating that the lid 42 is open, and the charging port 41 and the opening 43a are open.

Figure 4:
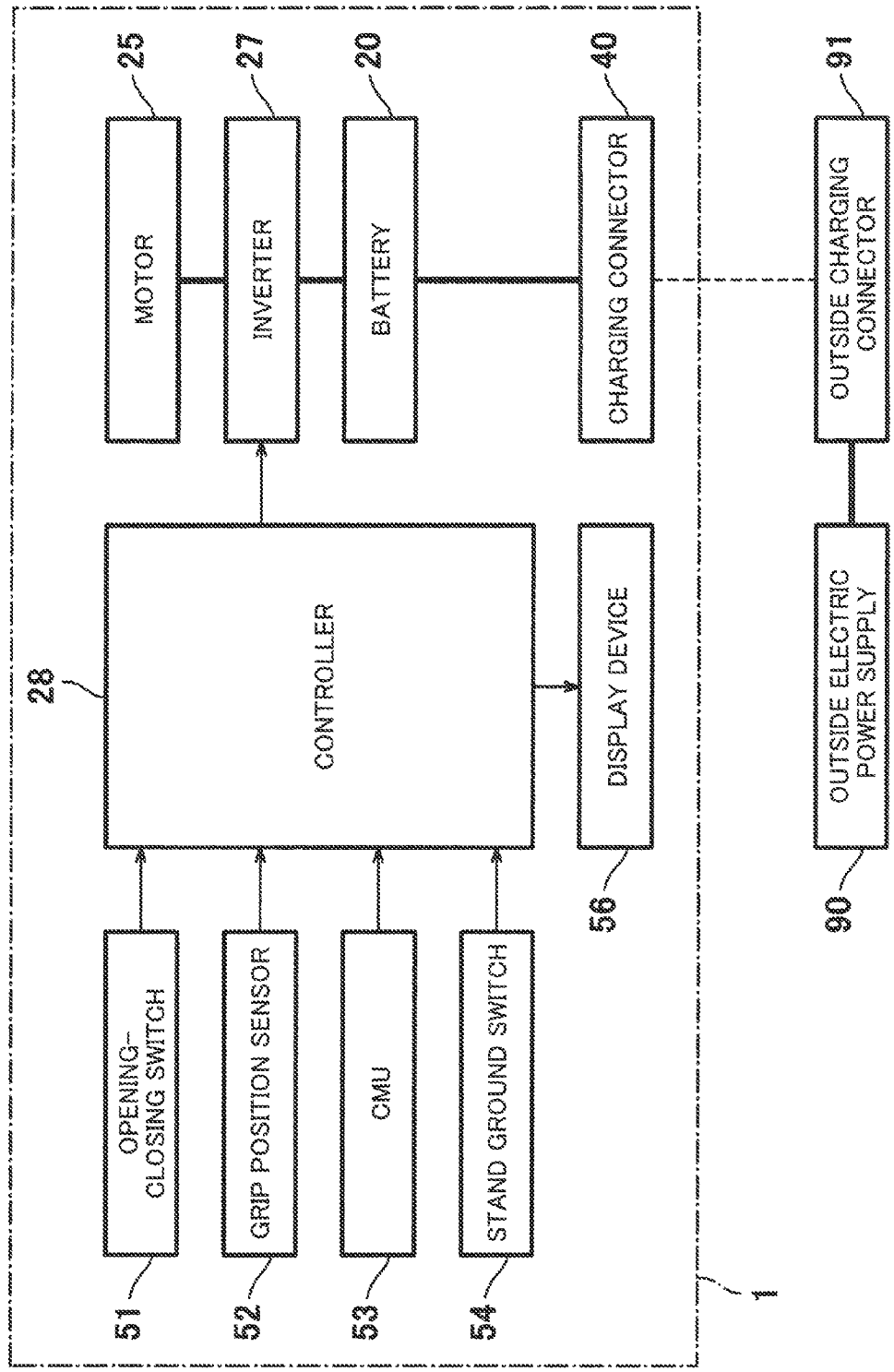
FIG. 4 is a block diagram showing a configuration of a control system of the electric motorcycle of FIG. 1.

FIG. 4 is a block diagram showing a configuration of a control system of the electric motorcycle 1 of FIG. 1. In FIG. 4, the components within a region surrounded by one-dotted line are components mounted in the electric motorcycle 1. As shown in FIG. 3, the batteries 20 are electrically connected to the charging connector 40 built into the electric motorcycle 1. In a state in which the outside charging connector 91 is attached to the charging connector 40, the batteries 20 are charged with the electric power supplied from the outside electric power supply 90. Note that the outside electric power supply 90 and the outside charging connector 91 are placed in suitable locations to be accessible from the electric motorcycle 1.

The charging connector 40 is a so-called quick charging connector. Specifically, a DC current flows between the charging connector 40 and the outside charging connector 91. The batteries 20 are chargeable with the DC current supplied thereto via the outside charging connector 91. This can eliminate a need for an AC/DC converter in the electric motorcycle 1, which can achieve space saving in the electric motorcycle 1. During the charging, DC electricity with a current of a great magnitude, which is substantially equal to that during discharging, can reduce time for the charging work.

The batteries 20 are configured to discharge the electricity stored therein to supply the electricity to the electric motor 25. As described above, the discharged DC electricity is converted into AC electricity by a switching operation performed by the inverter 27. The electric motor 25 is activated by the AC electricity generated by the inverter 27 and supplied to the electric motor 25.

A grip position sensor 52, a cell monitoring unit 53 (hereinafter will be referred to as "CMU"), and a stand ground switch 54 are connected to an input side of a controller 28 mounted in the electric motorcycle 1, together with the above stated opening-closing switch 51. A display device 56 is connected to an output side of the controller 28 together with the above stated inverter 27. The grip position sensor 52 detects an operation position of the accelerator grip 5a (see FIG. 1). The CMU 53 detects an amount of the electricity stored in the batteries 20. The stand ground switch 54 detects whether or not the vehicle body is standing independently by utilizing the side stand 30, specifically, whether or not the ground member 30b of the side stand 30 is in the ground position. The controller 28 controls the switching operation performed by the inverter 27 based on the operation position of the accelerator grip 5a which is detected by the grip position sensor 52, thereby controlling a current and frequency of the AC electricity to be supplied to the electric motor 25 and hence driving power generated by the electric motor 25. When the amount of the electricity stored in the batteries 20, which is detected by the CMU 53, is less than a predetermined value, the controller 28 causes the display device 56 to display information indicating that the amount of the electricity stored in the batteries 20 is less than the predetermined value. This allows the driver or passenger to carry out the charging work for the batteries 20 at an appropriate time.

Turning back to FIG. 3, to carry out the charging work, the driver or passenger stops the electric motorcycle 1, places the electric motorcycle 1 in the state in which the vehicle body is standing independently by utilizing the side stand 30 (see FIGS. 1 and 2), and opens the lid 42 to pen the opening 43a. Thus, in a structural view point, the charging port 41 is opened in an inward side relative to the opening 43a. In an electric control view point, the controller 28 shifts to a charging mode which permits the batteries 20 to be charged, because the conditions are satisfied, i.e., the opening-closing switch 51 outputs the ON signal and the stand ground switch 54 detects that the ground member 30b is in the ground position.

Then, the driver or passenger holds the outside charging connector 91 connected to the outside electric power supply 90, moves a tip end portion of the outside charging connector 91 into the casing 43 via the opening 43a, and attaches the outside charging connector 91 to the charging port 41. This allows the connector surface 92 of the outside charging connector 91 to be fitted to the connector surface 48 of the charging connector 40, thereby mechanically and electrically connecting the outside charging connector 91 to the connector body 47 of the charging connector 40.

The charging port 41 is placed such that it is oriented in one direction (leftward) in the vehicle with direction. Because of this, the charging work can be carried out without holding up the outside charging connector 91 to a location which is much higher than the upper surface of the vehicle body. Therefore, the charging work can be carried out easily. In addition, the charging port 41 is oriented in the direction closer to the side stand 30. Because of this, the driver or passenger can perform all of a stop work of the electric motorcycle 1, a parking work of the electric motorcycle 1, and the charging work, at one side in the vehicle width direction. Therefore, the electric motorcycle 1 can be easily handled. Furthermore, the charging connector 40 of the present embodiment is fastened to the seat frame member 12 supporting the seats 13 and 14, while the tandem grip 19, which can be gripped by the passenger during driving, is provided on the seat support member 16 supported on the seat frame member 12, at one side (left side) in the vehicle width direction (see FIG. 1). Therefore, the driver or passenger carries out the charging work while holding the outside charging connector 91 with one hand and holding the tandem grip 19 with the other hand. Because of this and the side stand 30 for allowing the vehicle body to stand independently, it becomes possible to effectively prevent the vehicle body from falling down when the outside charging connector 91 is attached to the charging port 41 or detached therefrom.

In a state in which the vehicle body of the electric motorcycle 1 is standing and the center line C in the vehicle width direction is inclined in one direction (leftward) in the vehicle width direction, an axis X of the casing 43 and the internal housing 46 of the charging connector 40 is inclined downward in one direction (leftward) in the vehicle width direction. This causes the opening 43a and the charging port 41 to be directed inward in a direction from their upper portions to their lower portions. This layout makes it possible to suitably prevent rain or snow from entering inside of the casing 43 through the opening 43*a*, or suitably prevent the rain or snow from reaching the charging port 41, when the lid 42 is opened to carry out the charging work while it is raining, snowing, etc.

A peripheral wall of the casing 43 is provided with a protruding portion 49 protruding in one direction in the vehicle width direction farther than the charging port 41 in a location outward relative to the charging port 41. The protruding portion 49, which serves as a roof, makes it possible to suitably prevent rain or snow from reaching the charging port 41, when the lid 42 is opened to carry out the charging work while it is raining, snowing, etc. Although in the present embodiment, the protruding portion 49 is provided to extend over an entire outer periphery of the peripheral wall of the casing 43 in the location outward relative to the charging port 41, it may be provided only above the charging port 41 so that it can serve merely as the roof.

After the charging work is finished, the outside charging connector 91 is detached from the charging connector 40, and the lid 42 is returned to the closed position. When the opening-closing switch 51 is outputting the OFF signal, or the stand ground switch is detecting that the ground member is not in the ground position, the controller 28 of the present embodiment causes the inverter 27 to be deactivated to prevent a situation in which the electric power is supplied to the electric motor 25 and thereby the electric motor 25 is activated, irrespective of the operation position of the accelerator grip 5*a* (see FIG. 1). Thus, the situation in which the electric motorcycle 1 drives by mistake can be avoided by electric control. When the opening-closing switch 51 is outputting the OFF signal, the controller 28 causes the display device 56 to display information indicating that the lid 42 is not in the closed position. Thus, the driver or passenger can be informed of a reason why the electric motor 25 is deactivated, which urges the driver or passenger to place the lid 42 in the proper closed position.

With reference to FIG. 1, a portion of the charging port 41 of the charging connector 40 is placed within a region A1 of a substantially inverted-A shape when viewed from side, which region is surrounded by the handle 5, the front seat 13 and the front step 17. More specifically, a portion of the charging port 41 of the charging connector 40 is placed within a region A2 connecting the front seat 13 to the front step 17, which region corresponds to a rear half portion of the region A1. For this reason, if the lid 42 is opened, not to mention a case where the outside charging connector 91 remains attached to the charging port 41, the driver cannot take a proper straddle attitude with the driver's feet resting on the front steps 17, and the driver seated on the front seat 13 can easily see an open/closed state of the lid 42 and a connected state of the connector. Since the charging connector 40 is placed in a location which substantially overlaps with the driver straddling when viewed from side, the situation in which the electric motorcycle 1 drives by mistake with the lid 42 opened can be prevented by a structural feature.

In the state in which the lid 42 is in the closed position, the electric motor 25 is permitted to be activated, and hence the electric motorcycle 1 can drive. Unless the charging port 41 of the charging connector 40 of the present embodiment is closed by the lid 42, the electric motor cycle 1 cannot start. Therefore, the charging port 41 can be protected effectively from foreign matters such as rain, snow, a bouncing stone, etc., from the ground surface.

Figure 5:
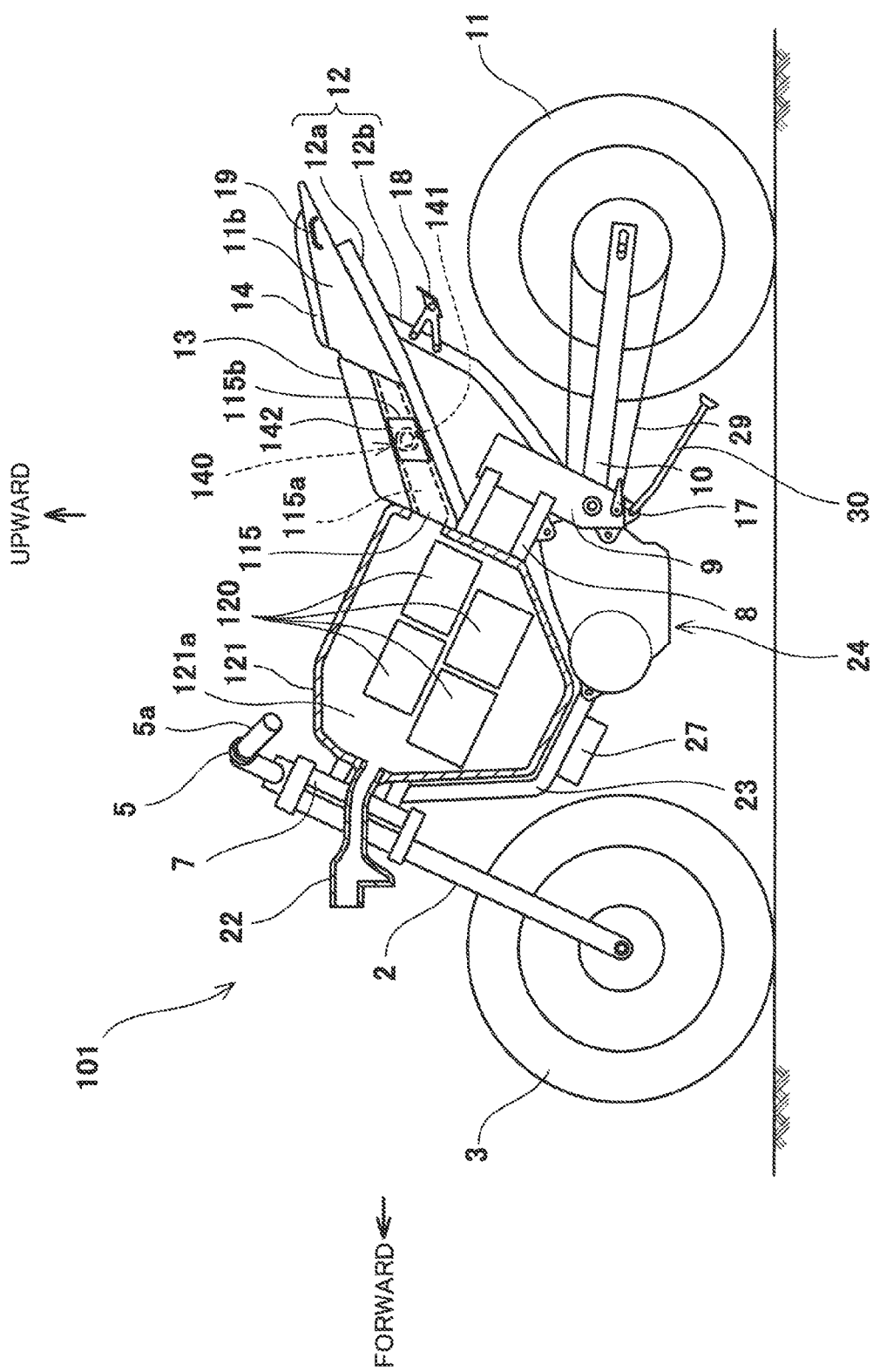
FIG. 5 is a left side view of an electric motorcycle according to a modified example of the embodiment of the present invention, a part of which is shown in cross-section.

FIG. 5 is a left side view of an electric motorcycle according to a modified example of the embodiment of the present invention, a part of which is shown in cross-section. In an electric motorcycle 101 of FIG. 5, each of a front seat support member 115 and a rear seat support member 11*b* has a hollow structure, and an inner space of the front seat support member 115 and an inner space of the rear seat support member 11*b* are communicated with each other. An inner space 115*a* of the front seat support member 115 is communicated with an inner space 121*a* of a battery case 121. Thus, the inner space 115*a* of the front seat support member 115 serves as a duct together with the inner space of the rear seat support member 11*b*, to discharge to outside in a rearward direction, the ram air guided to the inner space 121*a* of the battery case 121 through the introduction duct 22. A charging connector 140 may be accommodated into this duct such that a charging port 141 is oriented in one direction (leftward) in the vehicle width direction. In this case, preferably, a lid 142 may be provided to open and close an opening 115*b* formed on a surface of the front seat support member 115, which surface is at one side in the vehicle width direction.

Although the embodiment of the present invention has been described above, the above described configuration can be suitably changed. For example, although in the present embodiment, the charging port 41 is oriented obliquely downward in the state in which the vehicle body is standing independently, which is realized by utilizing the side stand 30, it may be oriented horizontally or obliquely upward. In this case, since the outside charging connector 91 can be made closer to the charging port horizontally or from slightly above, the charging work can be carried out easily.

Although the charging port 41 is oriented in the direction closer to the side stand 30 and away from the chain 29 in the vehicle width direction, it may be oriented in a direction away from the side stand 30 and closer to the chain 29 in the vehicle width direction. In the present invention, in a case where the vehicle body stands independently in an upright state without being inclined, for example, by utilizing a center stand, the charging port may be oriented in one direction in the vehicle width direction. Or, the charging port may be placed in a space defined by the head pipe, the pivot frame and the pivot of the swing arm, so long as the charging port is placed in the region A1 of a substantially inverted-A shape when viewed from side. Since the charging port is exposed in a side surface in the vehicle width direction in this way, it is not necessary to hold a charging wire to a location above the upper surface of the vehicle body, and it becomes easy to connect the outside charging connector to the charging port. As a result, the charging work can be carried out easily.

Although in the present embodiment, the protruding portion 49 of the casing 43 serves as the roof (see FIG. 3), it may be omitted by positioning the opening 43*a* of the casing 43 and the charging port 41 in substantially the same location in the axial direction. In this case, the opening shown in FIG. 3 may be placed inward in the vehicle width direction. Thus, the charging port 41 is placed inward in the vehicle width direction relative to an outer edge of the vehicle body (outer surface of the seat frame member 12 within the illustrated range), and the vehicle body serves as a roof to protect the charging port 41 from rain.

Although in the present embodiment, the angular displacement axis of the hinge 50 is placed in the lower portion of the casing 43 (i.e., below the charging port 41), it may be placed in the upper portion of the casing 43 (i.e., above the charging port 41). Thus, in the state in which the lid 42 is in the open position, the lid 42 extends outward in the vehicle width direction relative to the charging port 41 above the charging port 41. This allows the lid 42 to serve as a roof during the charging.

Although in the present embodiment, the charging port 41 is placed to be oriented inward in the vehicle width direction in a direction from its upper portion toward its lower portion in the state in which the vehicle body is standing independently with the center line C in the vehicle width direction being inclined when viewed from rear, the charging port 41 may be placed as such in the state in which the vehicle body is in an upright state with the center line C in the vehicle width direction extending vertically.

Specific shapes of the charging connector 40 built into the electric motorcycle 1 and the outside charging connector 91 are exemplary and other shapes may be used. Although a quick charging connector supplied with the DC current is preferably used, a charging connector supplied with an AC current is included in the scope of the present invention.

Although in the present embodiment, the controller 28 shifts to the charging mode when the two conditions are satisfied, i.e., the condition in which the lid is opened and the condition in which the vehicle body is standing independently by utilizing the side stand 30, are satisfied, it may shift to the charging mode when either one of the two conditions is satisfied.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

INDUSTRIAL APPLICABILITY

The present invention has advantages that it is possible to provide an electric motorcycle which allows a charging work to be carried out easily, and is effectively applicable to an electric motorcycle which can attain the advantages.

REFERENCE CHARACTERS LIST 1 electric motorcycle
3 front wheel
5 handle
6 vehicle body frame
8 main frame member
12 seat frame member
11 rear wheel
13 front seat
14 rear seat
17 front step
18 rear step
19 tandem grip
20 battery
25 electric motor
27 inverter
28 controller
29 chain
30 side stand
40 charging connector
41 charging port
2 lid
49 protruding portion
51 opening-closing switch
54 stand ground switch
90 outside electric power supply
91 outside charging connector
A1 region surrounded by handle, seat and step
A2 region connecting seat to step

The invention claimed is:

1. An electric motorcycle which drives a drive wheel by driving power generated by an electric motor, comprising:
   a charging port which is provided in a vehicle body and to which an outside charging connector connected to an outside electric power supply is removably attached; and
   a battery which is built into the vehicle body and configured to be charged with electric power supplied from the outside electric power supply in a state in which the outside charging connector is connected to the charging port, and to discharge the electric power stored therein to supply the electric power to the electric motor;
   wherein the charging port is oriented in one direction in a vehicle width direction to allow the outside charging connector to be fitted into the charging port from one side in the vehicle width direction,
   wherein the vehicle body is capable of standing independently in a state in which the vehicle body is inclined in one direction in the vehicle width direction; and
   wherein the charging port is placed at the one side in the vehicle width direction, and the charging port is inclined inward in the vehicle width direction in a direction from its upper portion to its lower portion in a state in which the vehicle body is standing independently.

2. The electric motorcycle according to claim 1, comprising:
   a side stand pivotally mounted to a lower portion of the vehicle body at the one side in the vehicle width direction;
   wherein the charging port is oriented in the one direction in the vehicle width direction, which is a direction closer to the side stand.

3. The electric motorcycle according to claim 2, comprising:
   a stand ground sensor for detecting whether or not the side stand is in contact with a ground; and
   a control section which shifts to a charging mode in which the electric motor is inhibited from being activated and the battery is chargeable when the stand ground sensor detects that the side stand is in contact with the ground.

4. The electric motorcycle according to claim 1, comprising:
   a seat on which a driver is seated;
   a step placed below the seat to allow a foot of the driver to rest thereon; and
   a handle placed forward relative to the seat and gripped by the driver;
   wherein at least a portion of the charging port is placed within a region surrounded by the seat, the step and the handle when viewed from the one side.

5. The electric motorcycle according to claim 1, comprising:
   a seat on which a driver is seated; and
   a step placed below the seat to allow a foot of the driver to rest thereon; and
   wherein at least a portion of the charging port is placed within a region connecting the step to the seat.

6. The electric motorcycle according to claim 1, wherein a roof is provided above the charging port.

7. The electric motorcycle according to claim 1, comprising:
   a lid for opening and closing the charging port.

8. The electric motorcycle according to claim 7, comprising:
- an opening-closing sensor for detecting whether the lid is opened or closed; and
- a control section which shifts to a charging mode in which the electric motor is inhibited from being activated and the battery is chargeable, when the opening-closing sensor detects that the lid is opened.

9. The electric motorcycle according to claim 1,
- wherein a charging connector is provided such that the charging port is removably connected to the outside charging connector such that a DC current flows between the charging connector and the outside charging connector.

10. An electric motorcycle which drives a drive wheel by driving power generated by an electric motor, comprising:
- a charging port which is provided in a vehicle body and to which an outside charging connector connected to an outside electric power supply is removably attached;
- a battery which is built into the vehicle body and configured to be charged with electric power supplied from the outside electric power supply in a state in which the outside charging connector is connected to the charging port, and to discharge the electric power stored therein to supply the electric power to the electric motor;
- a main frame member extending rearward from a head pipe;
- a first seat frame extending rearward and upward from the main frame member; and
- a second seat frame extending rearward and upward through a space below the first seat frame and coupled to the first seat frame;
- wherein the charging port is oriented in one direction in a vehicle width direction to allow the outside charging connector to be fitted into the charging port from one side in the vehicle width direction, and is placed in a space surrounded by the main frame member, the first seat frame and the second seat frame.

* * * * *